No. 666,615. Patented Jan. 22, 1901.
E. HANAK.
AUTOMATIC WEIGHING MACHINE.
(Application filed May 10, 1899.)
(No Model.) 3 Sheets—Sheet 1.

Witnesses:
Wm. F. Wattson
Ben. E. Harris

Inventor.
Edward Hanak
By W. F. Smyth
his atty.

No. 666,615. Patented Jan. 22, 1901.
E. HANAK.
AUTOMATIC WEIGHING MACHINE.
(Application filed May 10, 1899.)

(No Model.) 3 Sheets—Sheet 2.

Witnesses:
Wm. F. Wattson
Ben. E. Harris

Inventor.
Edward Hanak
By W H Smyth
His Atty.

No. 666,615. Patented Jan. 22, 1901.
E. HANAK.
AUTOMATIC WEIGHING MACHINE.
(Application filed May 10, 1899.)
(No Model.) 3 Sheets—Sheet 3.
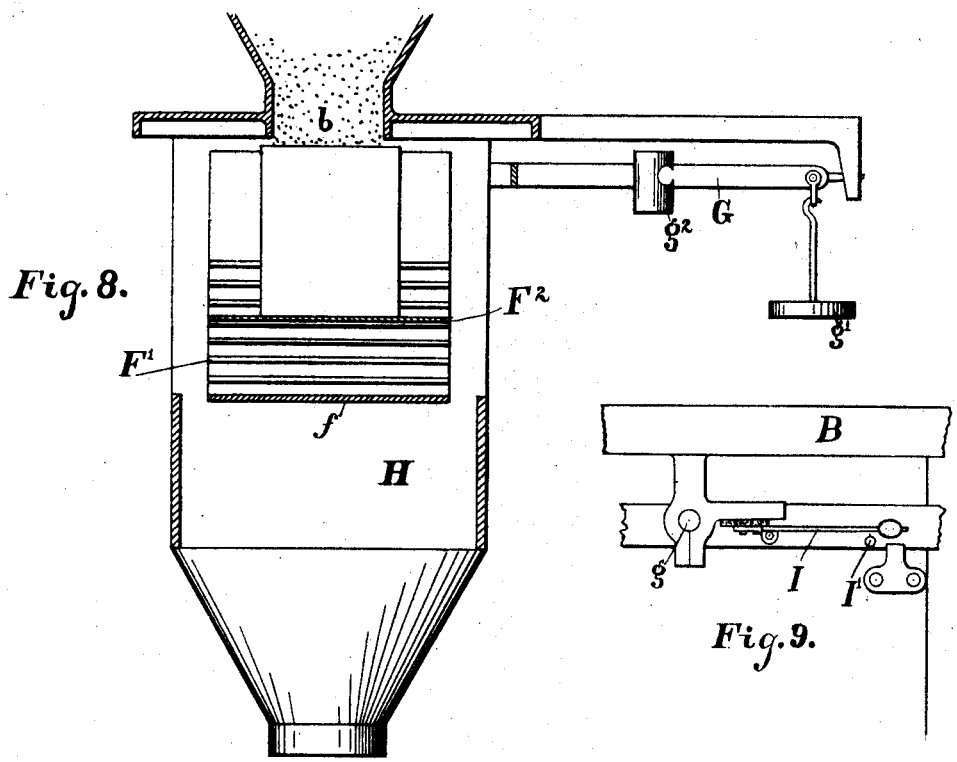
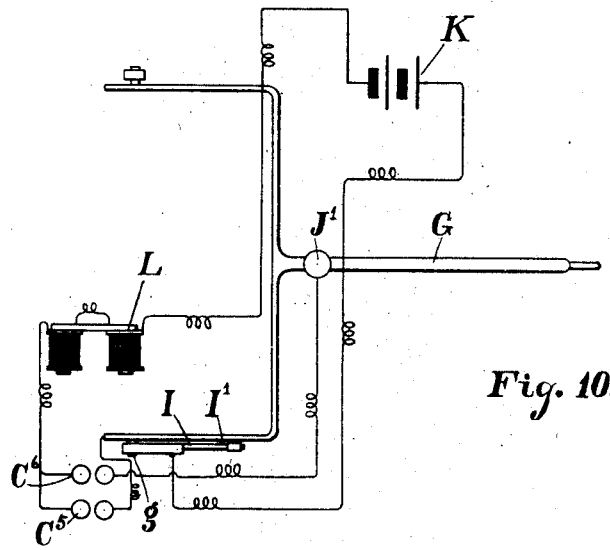
Witnesses:
Jesse R. Boff.
O. H. Reardon.
Inventor:
Edward Hanak
By W. H. Smyth
his Atty

UNITED STATES PATENT OFFICE.

EDWARD HANAK, OF SAN FRANCISCO, CALIFORNIA, ASSIGNOR TO THE UNION SCALE AND MANUFACTURING COMPANY, OF SAME PLACE.

AUTOMATIC WEIGHING-MACHINE.

SPECIFICATION forming part of Letters Patent No. 666,615, dated January 22, 1901.

Application filed May 10, 1899. Serial No. 716,267. (No model.)

*To all whom it may concern:*

Be it known that I, EDWARD HANAK, a citizen of the United States, residing at San Francisco, in the county of San Francisco and State of California, have invented certain new and useful Improvements in Automatic Weighing-Machines; and I do hereby declare the following to be a full, clear, and exact description of the same.

This invention relates to an automatic weighing-machine.

Its object is to provide a simple device for this purpose which will feed from a suitable source free flowing material, weigh the same accurately, and discharge the weighed material into a suitable bag, carton, or other receptacle and perform these functions automatically and with greater accuracy than has been heretofore possible with automatic weighing contrivances. Heretofore difficulty has been experienced with this class of machines owing to the variability brought about by changes in the suspended stream. By "suspended stream" I mean the material which is still falling when the scale-beam commences to move. It is obvious that a suspended stream of a given bulk of leaden shot would weigh more than a like stream of bran. The resultant weights of various materials will consequently vary for the same counterpoise-weight. The same undesirable result will occur in a modified way with some materials due to variations of atmospheric conditions. To overcome this undesired condition is one of the objects of the present invention.

One of the preferable forms in which this invention may be incorporated is illustrated in the accompanying drawings, in which—

Figure 1:
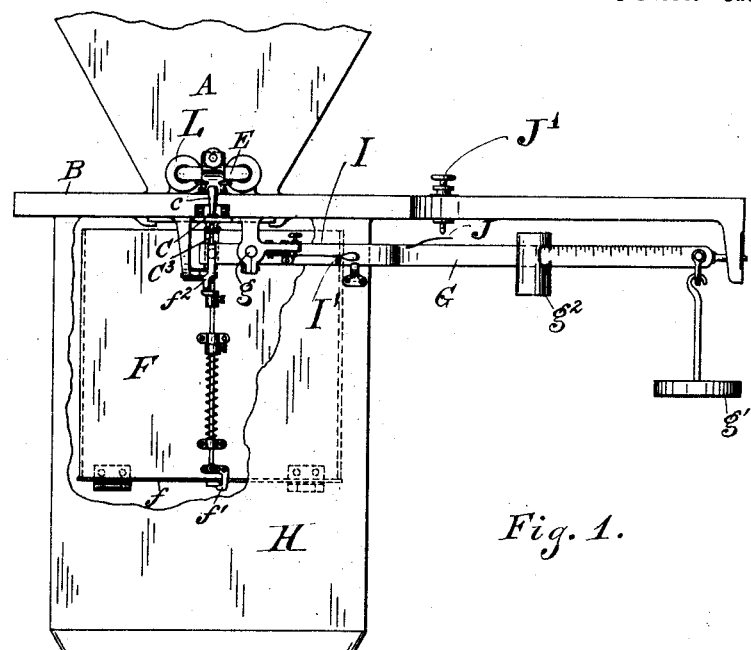
Figure 2:
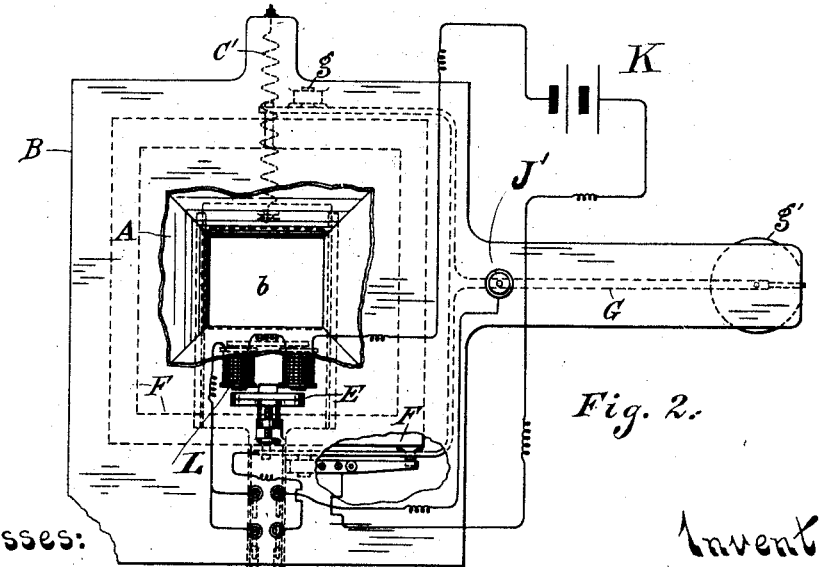
Figures 3, 6:
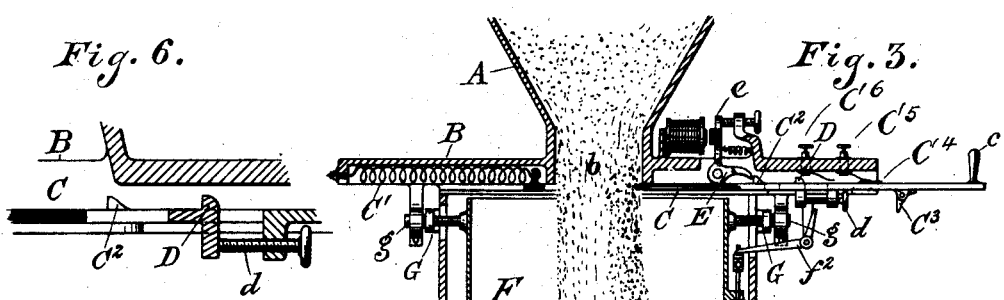
Figure 7:
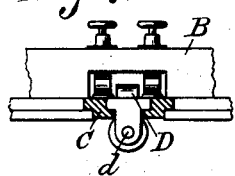
Figure 4:
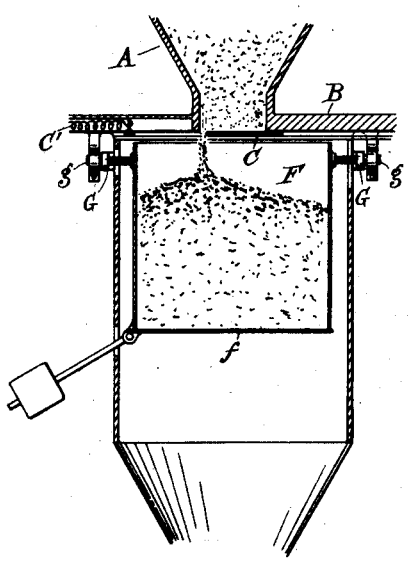
Figure 5:
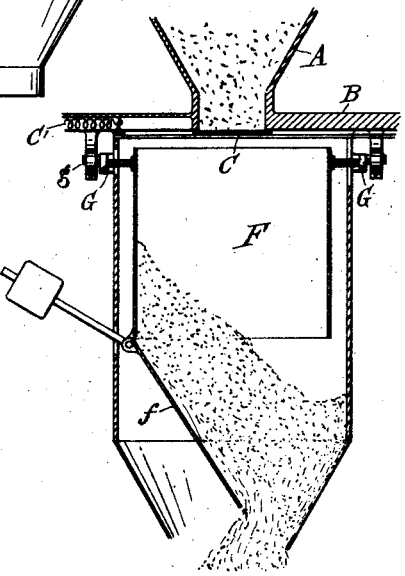

Figure 1 is a side elevation of the device, portions being broken away to better illustrate the construction. Fig. 2 shows a plan view, portions of which are also shown broken away to facilitate illustration. Fig. 3 is a sectional elevation showing a full-size filling-stream of material flowing into the weighing-receptacle. Fig. 4 is a sectional elevation showing the receptacle with nearly its complement of material and a weighing-stream supplying what it lacks of the required weight. Fig. 5 is a similar view to Fig. 4, showing the device in the next stage, dumping its load. Fig. 6 shows a detail of the adjustable stop for cut-off on enlarged scale. Fig. 7 is an end view of Fig. 6. Fig. 8 is a sectional elevation showing a modified form of the construction adapted to weigh into cartons or other independent receptacles. Fig. 9 is a detail, on enlarged scale, of the mechanism of the first contacting device or secondary weighing-beam. Fig. 10 is a diagrammatic view showing the electrical connections and wiring.

Referring to the accompanying drawings, A is a suitable source of supply, shown in the present instance as a hopper resting upon a platform or table B. Through this table B is a supply-aperture $b$, controlled by a gate, slide, or other suitable cut-off device. This is illustrated in the drawings as a plate C, sliding freely in guides on the lower side of table B. In this form the plate is preferably actuated in one direction by a coil-spring $C'$, one end of which is attached to the table. It is also provided with two latch-lugs, one of which, $C^2$, is preferably integral with the plate and the other, D, may be made adjustable and provided with an adjusting-screw $d$ or other suitable means for movably securing it in place, as shown in Figs. 3, 6, and 7. To the sliding plate C is attached a pawl, tappet, or other suitable tripping device $C^3$, adapted to operate in one direction only. The slide C is also supplied with a contact $C^4$ on its upper surface, insulated therefrom, suitably placed to engage and make electrical contact with two pairs of brush-contacts $C^5$ $C^5$ and $C^6$ $C^6$ successively by the sliding movement of plate C, thereby making and breaking the circuit. When, as in the present form, the cut-off C is opened by hand, a suitable handle $c$ is provided wherewith to draw out the cut-off plate, and thus open the supply-aperture $b$. A suitable holding and releasing device (shown herein, Fig. 3, as an electrically-operated latch-pawl E, pivotally attached to the table B in the path of the lugs $C^2$ and D) is provided to hold the cut-off device open and adapted to engage with either of the lugs $C^2$ and D.

Beneath the supply-aperture a weighing-receptacle of any suitable form or construction is provided in the path of the material. I have shown for the purposes of the form of the invention herein illustrated a bucket F, provided with a hinged counterweighted falling bottom $f$, suspended from a graduated beam G, which is pivoted on suitable bearings $g$, depending from the table B and provided with the usual stationary and sliding weights $g'$ and $g^2$, respectively, constituting a weight-moved member, as shown in Figs. 1 and 3. This form of receptacle I preferably employ when the materials to be weighed are to be automatically discharged from the weighing-receptacle into their permanent package, and under these circumstances I prefer to surround the weighing-bucket with an outside stationary shell or casing H, provided with a tapering or funnel-shaped bottom to guide the material and prevent the escape of dust due to the falling of light or finely-divided substances. For the purpose of operating the falling bottom $f$ a spring-latch $f'$ is provided with a bell-crank tripping-lever $f^2$, suspended from the table B in the path of the actuating-tappet $C^3$ to engage therewith, Fig. 3.

When it is desired to feed the material to be weighed directly into its permanent package or receptacle and avoid the use of the bucket as such, the bottom-tripping mechanism may be thrown out of gear at any of the joints between the latch and the sliding plate. Thus the dumping function of the bucket-bottom is dispensed with, and it becomes simply a wearing-platen for the support of the carton or other packing-case, which is removed by hand or other suitable means when filled and weighed. When it is desirable to still further reduce the weight of the suspended stream, as when small cartons are to be filled, the bottom $f$ may be made adjustable as to height or a separate plate or platen introduced and lugs or other supporting devices provided, either stationary or adjustable, for supporting the movable bottom. For simplicity I have shown the provision for this contingency as lugs or ribs F' on the sides of the bucket, as shown particularly in Fig. 8, and a loose plate $F^2$, resting thereon to serve as a support for a carton. When the loose plate F and the lugs F' are employed to support cartons, one or two of the side walls of the weighing-receptacle may be omitted or the side may be hinged, or any other simple means of providing access to the interior of the weighing-receptacle may be provided. This modification is shown in Fig. 8.

Suitable electromagnetic devices and connections are provided to operate the pawl E in such manner that the pawl is raised out of contact with the lugs $C^2$ and D successively by the continued raising of the weighing-beam G, due to increasing weight deposited in the weighing-receptacle. These devices and connections in connection with the illustrated form of the invention consist, preferably, of the following instrumentalities, (illustrated fully in Figs. 1, 2, and 3, and particularly shown in Figs. 9 and 10:) Attached to the frame of the machine is a light pivoted insulated contact I, forming a second supplementary weighing-beam, also another weight-moved member. Adjacent thereto and adapted to engage therewith is an electrical contact-point I', attached to the main weighing-beam. Another light contact connection, shown in the form of a flat spring J, is secured to the weighing-beam, and an insulated adjustable contact-point J' is provided, adapted to form an electrical connection by the continued upward movement of the scale-beam. These contact connections are suitably wired with a source of electrical energy K and a magnet L to actuate, by magnetic attraction, the upward extension $e$ of the pivoted pawl E. This electrical connection or wiring is clearly shown in Fig. 2 and in the diagram Fig. 10. In the construction illustrated, K represents an electric battery, one pole of which is connected to one pole of the electromagnet L. The other pole of the electromagnet L is connected to one member of each pair of brushes $C^5$ $C^6$, which are insulated from table B. The other member of the pair of brushes $C^6$ is connected to the contact-point J'. The other member of the pair of brushes $C^5$ is connected to the weighing-beam G. The other pole of the battery K is connected to the beam I.

The operation of this device is as follows: The cut-off plate C is withdrawn to its greatest extent, leaving a full flowing-opening for the material, as shown in Fig. 3, the scale-beam having been weighed and adjusted to the required weight. When the amount of material has fallen into the weighing-receptacle sufficient to start the weighing-beam upward, the point I' touches the light pivoted contact-beam I, making electrical contact therewith, the strip $C^4$, connecting the two members of the pair of brushes $C^5$, energizing the magnet L, thus releasing the pawl E from engagement with the lug C''. The cut-off thus released is drawn across the aperture $b$ till the pawl E engages with the adjustable stop D, which is suitably adjusted to leave a small opening of the feed-aperture $b$, as shown in Fig. 4, providing for a weighing-stream of very small dimensions. The strip $C^4$ is now connecting the two members of the pair of brushes $C^6$. The weight in the bucket continues to increase by the increment of the weighing-stream. The scale-beam continues to rise till the touching of J and J' again makes a yielding electrical contact and again energizes the magnet and operates the pawl E, thus again releasing the plate C, this time wholly closing the supply-aperture. During these described operations the electrical current flows in the following-described manner: When the scale-beam is empty of the load to be weighed, the electrical circuit is of course broken and discontinuous. When the load has reached the amount to make the first contact—that is, between I' and I—the electric circuit is completed, following the course from one pole of the battery K to the magnet L, thence through the pair of brushes $C^5$ to the main weighing-beam G, and thence through its contact-point I' and supplementary weighing beam I to the other pole of the battery K. The weight having reached its full complement and the second contact made, the second electrical circuit is made, the first having been broken by the strip C⁴ passing from the pair of brushes C⁵ to the pair of brushes C⁶, the current now starting from the same pole of the battery as heretofore, thence to the magnet L, from the magnet to the connected pair of brushes C⁶, thence to the contact-point J', through the spring-contact J to the main weighing-beam G, thence through its contact-point I', secondary weighing-beam I, and so to the other pole of the battery. The last movement of the cut-off plate performs another function—that of dumping the weighed material. This is brought about by the engagement of the tappet C³ with the upward extension of the lever $f''$, which in turn releases the latch $f'$, thus permitting the hinged bottom to fall and discharge the contents of the bucket, as shown in Fig. 5. The bottom being freed of its load recloses and latches by being suitably counterweighed and is ready for another charge.

The operation in connection with carton-filling, as already referred to, is substantially the same as that just described, with the exception of discharge after weighing.

It is apparent that many changes in detail will readily suggest themselves to mechanics or become necessary in connection with the various forms of weighing devices and the materials to be weighed without departing in any way from the essential character of this invention. I therefore do not desire to confine myself to the particular form of construction herein set forth or arrangement of or proportion of parts herein shown; but

What I claim as new, and desire to secure by Letters Patent, is—

1. In an electrically-controlled weighing-machine having a beam provided with a pea or other suitable counterpoise, a bucket or receptacle to receive the material to be weighed attached on one of the arms of the scale-beam, a hopper arranged over said bucket provided with a discharge-opening, said opening having a slidable gate provided with projections adapted to engage with an electrically-actuated pawl and means whereby through the movement of the scale-beam said pawl engages successively with the projections to effect a large filling and a small weighing stream, a supplementary weighing-beam suitably arranged in electrical connection whereby the pawl is disengaged from the sliding gate to permit its complete closing and means for discharging the weighed material.

2. In an electrically-controlled weighing-machine having a beam provided with a pea or other suitable counterpoise, a bucket or receptacle having a hinged falling bottom to receive the material to be weighed attached on one of the arms of the scale-beam, a hopper arranged over said bucket provided with a discharge-opening, said opening having a slidable gate provided with projections adapted to engage with an electrically-actuated pawl and means whereby through the movement of the scale-beam said pawl engages successively with the projections to effect a large filling and a small weighing stream, a supplementary weighing-beam suitably arranged in electrical connection whereby the pawl is disengaged from the sliding gate to permit its complete closing and means for discharging the weighed material.

3. In an electrically-controlled weighing-machine having a beam provided with a pea or other suitable counterpoise, a bucket or receptacle having a hinged falling bottom to receive the material to be weighed attached on one of the arms of the scale-beam, a hopper arranged over said bucket provided with a discharge-opening, said opening having a slidable gate provided with projections adapted to engage with an electrically-actuated pawl and means whereby through the movement of the scale-beam said pawl engages successively with the projections to effect a large filling and a small weighing stream, a supplementary weighing-beam suitably arranged in electrical connection whereby the pawl is disengaged from the sliding gate to permit its complete closing and means for discharging the weighed material comprising a trip adapted to engage with the sliding gate whereby the hinged bottom is released by the closing of the sliding gate.

4. In an electrically-controlled weighing-machine having a beam provided with a pea or other suitable counterpoise, a bucket or receptacle having a hinged falling bottom to receive the material to be weighed attached on one of the arms of the scale-beam, a hopper arranged over said bucket provided with a discharge-opening, said opening having a spring-actuated slidable gate provided with projections adapted to engage with an electrically-actuated pawl and means whereby through the movement of the scale-beam said pawl engages successively with the projections to effect a large filling and a small weighing stream, a supplementary weighing-beam suitably arranged in electrical connection whereby the pawl is disengaged from the sliding gate to permit its complete closing and means for discharging the weighed material comprising a trip adapted to engage with the sliding gate whereby the hinged bottom is released by the closing of the sliding gate.

5. In an electrically-controlled weighing-machine having a beam provided with a pea or other suitable counterpoise, a bucket or receptacle having a hinged falling bottom to receive the material to be weighed attached on one of the arms of the scale-beam, a casing provided with a funnel-shaped discharge inclosing the bucket or receptacle, a hopper arranged over said bucket provided with a discharge-opening, said opening having a spring-actuated slidable gate provided with projections adapted to engage with an electrically-actuated pawl and means whereby through the movement of the scale-beam said pawl engages successively with the projections to effect a large filling and a small weighing stream, a supplementary weighing-beam suitably arranged in electrical connection whereby the pawl is disengaged from the sliding gate to permit its complete closing and means for discharging the weighed material comprising a trip adapted to engage with the sliding gate whereby the hinged bottom is released by the closing of the sliding gate.

EDWARD HANAK.

Witnesses:
WM. C. CLARK,
FRANK G. WESTERHOUSE.